(12) United States Patent
Tsuda

(10) Patent No.: US 12,420,750 B2
(45) Date of Patent: Sep. 23, 2025

(54) DRIVER ASSISTANCE DEVICE

(71) Applicant: ISUZU MOTORS LIMITED, Tokyo (JP)

(72) Inventor: Ryuta Tsuda, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 230 days.

(21) Appl. No.: 17/906,478

(22) PCT Filed: Mar. 24, 2021

(86) PCT No.: PCT/JP2021/012226
§ 371 (c)(1),
(2) Date: Sep. 16, 2022

(87) PCT Pub. No.: WO2021/193710
PCT Pub. Date: Sep. 30, 2021

(65) Prior Publication Data
US 2023/0159010 A1 May 25, 2023

(30) Foreign Application Priority Data
Mar. 26, 2020 (JP) .................. 2020-056479

(51) Int. Cl.
*B60T 7/12* (2006.01)
*G06V 10/14* (2022.01)
(Continued)

(52) U.S. Cl.
CPC ............... *B60T 7/12* (2013.01); *G06V 10/14* (2022.01); *G06V 20/597* (2022.01);
(Continued)

(58) Field of Classification Search
CPC ..... B60T 7/12; B60T 2220/00; G06V 20/597; G06V 40/16–179
See application file for complete search history.

(56) References Cited

U.S. PATENT DOCUMENTS 9,460,601 B2 * 10/2016 Mimar .................. G08B 21/06
10,165,971 B2 * 1/2019 Omi ...................... A61B 5/0077
(Continued)

FOREIGN PATENT DOCUMENTS

| CN | 102310771 A | 1/2012 |
|---|---|---|
| CN | 109803583 A | 5/2019 |

(Continued)

OTHER PUBLICATIONS

OMI, JP 2010-097379, machine translation (Year: 2010).*
International Search Report of PCT/JP2021/12226 dated May 18, 2021.

*Primary Examiner* — Mark L. Greene
(74) *Attorney, Agent, or Firm* — Shih IP Law Group, PLLC

(57) ABSTRACT

A driver assistance device includes an image analysis part that analyzes a captured image obtained by capturing a face of a driver of a vehicle, and an abnormality determination processing part that determines whether a state of the driver is in an abnormal state on the basis of an analysis result of the captured image, and performs an emergency driving stop process of causing the vehicle to perform automatic braking if the driver's state is determined to be in the abnormal state. The abnormality determination processing part does not perform the emergency driving stop process when the level of recognition of the face of the image analysis part is lower than the predetermined level.

6 Claims, 3 Drawing Sheets

(51) Int. Cl.
 *G06V 20/59* (2022.01)
 *G06V 40/16* (2022.01)
 *G08G 1/16* (2006.01)

(52) U.S. Cl.
 CPC ............ *G06V 40/171* (2022.01); *G08G 1/16* (2013.01); *B60T 2220/00* (2013.01)

(56) References Cited

U.S. PATENT DOCUMENTS

| | | | |
|---|---|---|---|
| 11,625,927 B2 * | 4/2023 | Morimoto | G06V 40/16 382/103 |
| 2019/0065873 A1 | 2/2019 | Wang | |
| 2021/0009150 A1 | 1/2021 | Chen et al. | |
| 2021/0049386 A1 | 2/2021 | Wang et al. | |
| 2021/0049387 A1 | 2/2021 | Wang et al. | |
| 2021/0049388 A1 | 2/2021 | Wang et al. | |
| 2021/0081690 A1 | 3/2021 | Inagaki et al. | |

FOREIGN PATENT DOCUMENTS

| | | | |
|---|---|---|---|
| JP | 2007093038 A | * | 4/2007 |
| JP | 2010097379 A | | 4/2010 |
| JP | 2018030425 A | | 3/2018 |
| JP | 2019028766 A | | 2/2019 |
| JP | 2019-174885 A | | 10/2019 |
| JP | 2019536673 A | | 12/2019 |
| WO | 2019/028798 A1 | | 2/2019 |

\* cited by examiner

DRIVER ASSISTANCE DEVICE

CROSS-REFERENCE TO RELATED APPLICATIONS

The present application is a U.S. National Stage entry of PCT Application number PCT/JP2021/012226, filed on Mar. 24, 2021, which claims priority under 35 U.S.C § 119 (a) to Japanese Patent Application No. 2020-056479, filed on Mar. 26, 2020, contents of which are incorporated herein by reference in their entirety.

TECHNICAL FIELD

The present invention relates to a driver assistance device that appropriately brakes a vehicle when a driver is in an abnormal state.

BACKGROUND OF THE INVENTION

Development of an emergency driving stop system that automatically stops a vehicle such as a bus when an abnormality occurs in a driver of the vehicle is promoted. In the emergency driving stop system, when it is determined that the driver is in an abnormal state, the vehicle comes to a stop after a warning, a notification, and automatic braking.

PRIOR ART

Patent Document

[Patent Document 1]: Japanese Unexamined Patent Application Publication No. 2019-28766

BRIEF DESCRIPTION OF THE INVENTION

Problem to be Solved by the Invention

In the above-described emergency driving stop system, a method of automatically detecting whether or not the driver is in an abnormal state by analyzing a captured image obtained by capturing the driver has been proposed. However, when the driver wears a worn article on his/her face, for example, the driver's face may not be recognized with the method of analyzing the captured image, which may result in a misjudgment of the driver's state. Therefore, there is a risk of stopping the vehicle in error.

The present invention focuses on this point, and its object is to appropriately operate an emergency driving stop system.

Means for Solving the Problem

One aspect of the present invention provides a driver assistance device including: an image analysis part that analyzes a captured image obtained by capturing a face of a driver of a vehicle; and an abnormality determination processing part that determines whether a state of the driver is an abnormal state on the basis of an analysis result of the captured image, and performs an emergency driving stop process of causing the vehicle to perform automatic braking when the driver is determined to be in the abnormal state, wherein the abnormality determination processing part does not perform the emergency driving stop process when a level of recognition of the face of the image analysis part is lower than a predetermined level.

The image analysis part may analyze the captured image obtained by the imaging device capturing a predetermined imaging range, and the abnormality determination processing part does not need to perform the emergency driving stop process when the level of recognition of the face positioned within the imaging range is lower than a predetermined level.

The image analysis part may detect a feature point of a face from the captured image, and the abnormality determination processing part may determine that the level of recognition of the face is lower than a predetermined level when the number of feature points detected by the image analysis part is less than a predetermined number.

The image analysis part may analyze a captured image obtained by capturing the face on which a worn article is worn, and the abnormality determination processing part does not need to perform the emergency driving stop process when the level of recognition of the face is lower than a predetermined level due to the worn article.

The image analysis part may analyze a captured image obtained by capturing, with an infrared camera, the face on which a black worn article is worn.

The abnormality determination processing part does not need to perform the emergency driving stop process when the level of recognition of the face continues to be lower than a predetermined level for a predetermined time.

Effect of the Invention

According to the present invention, it is possible to appropriately operate an emergency driving stop system.

DESCRIPTION OF EMBODIMENTS

Configuration of a Driver Assistance Device

A configuration of a driver assistance device according to an embodiment of the present invention is described with reference to FIG. 1.

Figure 1:
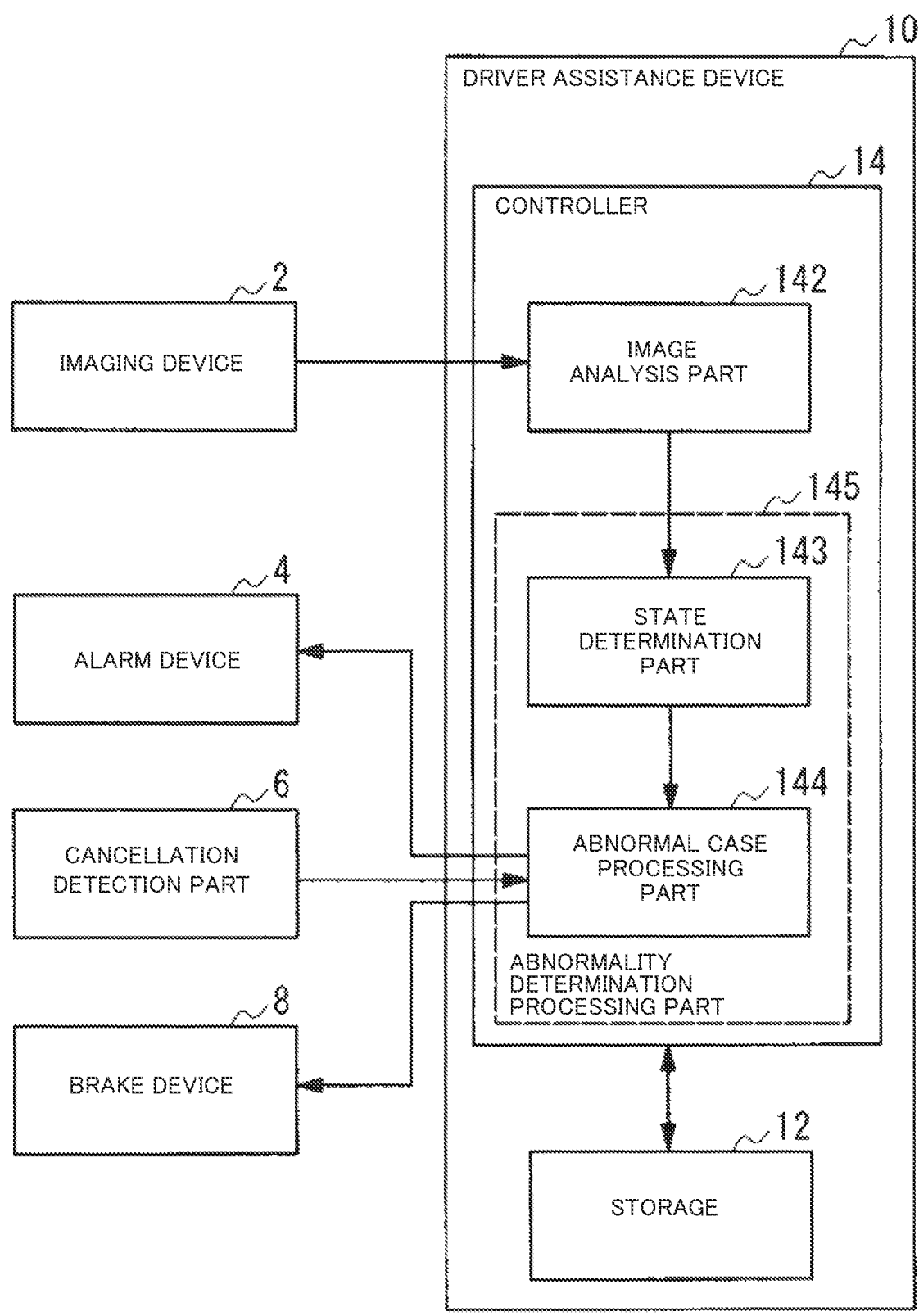
FIG. 1 illustrates a schematic configuration of a vehicle 1 on which a driver assistance device 10 according to an embodiment is mounted.

FIG. 1 illustrates a schematic configuration of a vehicle 1 on which a driver assistance device 10 according to an embodiment is mounted. The vehicle 1 is a bus, for example. The driver assistance device 10 is capable of executing an emergency driving stop system. When the driver assistance device 10 determines that a driver of the vehicle 1 is in an abnormal state, the driver assistance device 10 issues an alarm and automatically brakes the vehicle 1. The abnormal state of the driver means a case where the driver falls into a situation where he/she cannot safely drive the vehicle 1. For example, the driver assistance device 10 monitors (i) a collapsed posture of the driver, (ii) a closed eye state of the driver, and (iii) whether there is a steering wheel operation by the driver, and automatically determines whether the driver is in the abnormal state.

As shown in FIG. 1, the vehicle 1 includes an imaging device 2, an alarm device 4, a cancellation detection part 6, a brake device 8, and the driver assistance device 10.

The imaging device 2 is a driver monitoring camera that captures an image of the driver while the vehicle 1 is travelling. The imaging device 2 is installed, facing toward the driver, on a meter panel of the vehicle 1 and captures images of the driver's face and posture, for example. The imaging device 2 captures the images at predetermined intervals, and outputs the captured images to the driver assistance device 10.

The alarm device 4 is an alarm part that issues an alarm to the driver. For example, when the driver assistance device 10 determines that the driver is in an abnormal state, the alarm device 4 issues an alarm to alert the driver. The alarm device 4 provides a notification to the effect that the vehicle 1 is being caused to perform automatic braking since the driver is in an abnormal state. The alarm device 4 may include a speaker that makes a sound such as an alarm, a display part that displays a warning screen, and a vibration generation part that generates vibrations.

In addition, the alarm device 4 issues an alarm to inform the people around the vehicle 1 about the abnormality. At this time, the alarm device 4 may turn on or blink various types of lights. This makes it easy for other vehicles and pedestrians to take appropriate measures since they can recognize that the vehicle 1 is in the abnormal state.

The cancellation detection part 6 detects a cancellation which the driver makes to stop the execution of the emergency driving stop process. For example, when the alarm device 4 provides the notification to the effect that the vehicle is being caused to perform automatic braking, the driver can cancel the automatic braking (emergency driving stop process) of the vehicle 1 by operating a predetermined operation switch (hereinafter referred to as a cancel switch) when the driver determines that he/she is not in the abnormal state. The cancellation detection part 6 detects that the cancellation is carried out when the driver operates the cancel switch when the alarm device 4 provided the notification to the effect that automatic braking is executed on the vehicle 1.

The brake device 8 is a device that brakes the moving vehicle 1. For example, the brake device 8 automatically brakes the vehicle 1 if the cancellation detection part 6 does not detect the driver's operation within a predetermined time period from when the alarm device 4 starts to provide the notification. The brake device 8 includes a disk brake provided on a wheel of the vehicle 1, for example.

The driver assistance device 10 controls operations of the vehicle 1. Here, the driver assistance device 10 controls operations of the imaging device 2, the alarm device 4, the cancellation detection part 6, and the brake device 8, and executes the emergency driving stop process. The driver assistance device 10, as will be described in detail below, does not perform the emergency driving stop process when the driver's face in the captured images captured by the imaging device 2 cannot be stably recognized. By doing this, an erroneous determination based on erroneous recognition can be prevented, and as a result, it is possible to prevent causing the vehicle 1 to perform automatic braking by error.

As shown in FIG. 1, the driver assistance device 10 includes a storage 12 and a controller 14. The storage 12 includes a read only memory (ROM) and a random access memory (RAM), for example. The storage 12 stores programs to be executed by the controller 14 and various types of data. In addition, the storage 12 stores information such as a threshold value used at the time of determining abnormality.

The controller 14 is a central processing unit (CPU), for example. The controller 14 performs the emergency driving stop process by executing the programs stored in the storage 12. The controller 14 functions as an image analysis part 142, a state determination part 143, and an abnormal case processing part 144, as shown in FIG. 1.

The image analysis part 142 analyzes a captured image obtained by capturing the face of the driver of the vehicle 1. That is, the image analysis part 142 sequentially analyzes captured images captured by the imaging device 2. At this time, the image analysis part 142 analyzes a captured image obtained by the imaging device 2 capturing a predetermined imaging range. The image analysis part 142 obtains the amount of change in the driver's posture, the deriver's closed eye state, and the like from the sequentially analyzed captured images. By detecting many feature points of the driver's face from the captured images, the image analysis part 142 can recognize the contour of face or the like.

There are cases where a driver puts a worn article on his/her face while the vehicle is traveling. Therefore, the image analysis part 142 may analyze a captured image obtained by capturing a face on which the worn article is worn. For example, the image analysis part 142 analyzes a captured image obtained by capturing a face wearing a black worn article. When the worn article is worn on the face, the image analysis part 142 cannot detect many feature points of the face of the driver so that the image analysis part 142 may not recognize the face stably. In particular, the face may not be appropriately detected when the worn article is black since the black worn article absorbs infrared light of an infrared camera, which is the imaging device 2.

Figure 2:
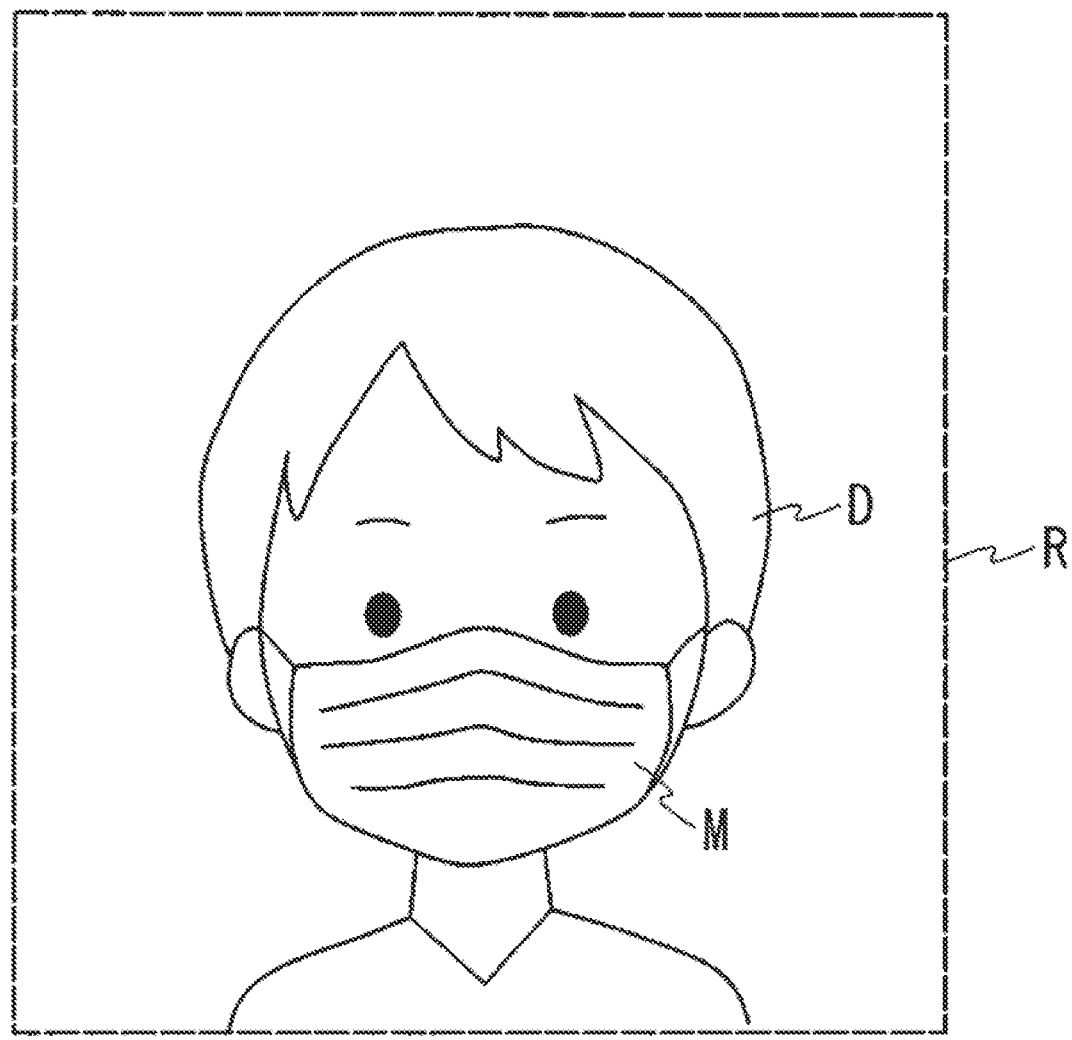
FIG. 2 schematically illustrates a captured image to be analyzed.

FIG. 2 schematically illustrates a captured image to be analyzed. In the captured image of FIG. 2, the face of a driver D is captured within an imaging range R. Here, a mask M, as the worn article, is worn on the face of the driver D. Since the mask M covers a large area of the driver's face, it becomes difficult for the image analysis part 142 to identify the contour of face, and the image analysis part 142 may not recognize the face stably. The mask M has been described as an example of the worn article in the above description, but the present invention is not limited thereto. The worn article may be sunglasses.

In addition, a mounting position of a camera, as the imaging device 2, or a driving position of the driver may not be within a prescribed range. In such a case also, the driver's face may not be recognized stably.

The state determination part 143 determines the driver's state while the vehicle 1 is traveling. The state determination part 143 determines whether the driver's state is an abnormal state on the basis of an analysis result of the image analysis part 142. For example, when the level and duration of the collapsed posture of the driver are larger than a predetermined threshold, the state determination part 143 determines that the driver is in an abnormal state. When the driver's closed eye state continues for a predetermined time or longer, the state determination part 143 determines that the driver is in the abnormal state. It should be noted that the term "collapsed posture" refers to "slumped over," "dropping one's head," "bent over backwards," "arching one's body back," "head collapsed sideways," "collapsed sideways," and "reclined sideways".

When the state determination part 143 determines that the driver is in the abnormal state, the abnormal case processing part 144 controls the alarm device 4 and the brake device 8. Specifically, upon determining that the driver is in the abnormal state, the abnormal case processing part 144 causes the alarm device 4 to issue an alarm. For example, the abnormal case processing part 144 causes the alarm device 4 to provide a notification to the effect that the vehicle 1 is to be caused to perform automatic braking. After that, if the cancellation detection part 6 does not detect a cancellation (operation of the cancel switch) performed by the driver within the predetermined time period, the abnormal case processing part 144 determines that the driver is likely to be in the abnormal state, and causes the vehicle 1 to perform automatic braking by operating the brake device 8.

When the image analysis part 142 can stably recognize the driver's face, the state determination part 143 can appropriately determine the driver's state. On the other hand, when the image analysis part 142 cannot stably recognize the face, the state determination part 143 may make an erroneous determination since the driver's state cannot be stably determined.

In the present embodiment, the state determination part 143 and the abnormal case processing part 144 function as an abnormality determination processing part 145 that performs the emergency driving stop process of causing the vehicle 1 to perform automatic braking on the basis of an automatic detection of the abnormal state of the driver. When the level of recognition of the face by the image analysis part 142 is lower than a predetermined level, the abnormality determination processing part 145 does not perform the emergency driving stop process. For example, when the level of recognition of the face positioned within the imaging range is lower than the predetermined level, the abnormality determination processing part 145 does not perform the emergency driving stop process. By doing this, the abnormality determination processing part 145 does not perform (i) a determination of the abnormal state of the driver based on the analysis result of the image analysis part 142 and (ii) braking of the vehicle 1 in the event of the abnormal state. The level of recognition of the face is determined by the number of feature points of the face detected from the captured images, for example. When the number of detected feature points is less than the predetermined number, the abnormality determination processing part 145 determines that the level of recognition is lower than the predetermined level.

As described above, when the driver has put on the worn article such as a mask on his/her face, since not many feature points of the face can be detected, there is a possibility that the image analysis part 142 cannot stably recognize the face. Therefore, when the image analysis part 142 cannot stably recognize the face due to the worn article (in other words, when the level of recognition of the face is lower than the predetermined level), the abnormality determination processing part 145 does not perform the emergency driving stop process.

When the level of recognition of the face continues to be lower than the predetermined level for a predetermined time period, the abnormality determination processing part 145 does not perform the emergency driving stop process. That is, when the state in which the face cannot be recognized stably had persisted, the abnormality determination processing part 145 does not perform the emergency driving stop process. By doing this, if the level of recognition is temporarily low due to a disturbance or the like, it is possible to prevent performance of the emergency driving stop process. It should be noted that the abnormality determination processing part 145 need not perform the emergency driving stop process if the ratio of the time period in which the recognition level is lower than the predetermined level exceeds a predetermined ratio within a reference time period.

In the above description, the abnormality determination processing part 145 performs the emergency driving stop process when the abnormality determination processing part 145 automatically detects that the driver is in the abnormal state by analyzing the captured images obtained by capturing the driver, but it is not limited to this. For example, when the driver does not perform the steering wheel operation continuously for a predetermined time or longer, the abnormality determination processing part 145 may perform the emergency driving stop process regardless of the analysis of the captured images.

Operation Example of the Driver Assistance Device

Figure 3:
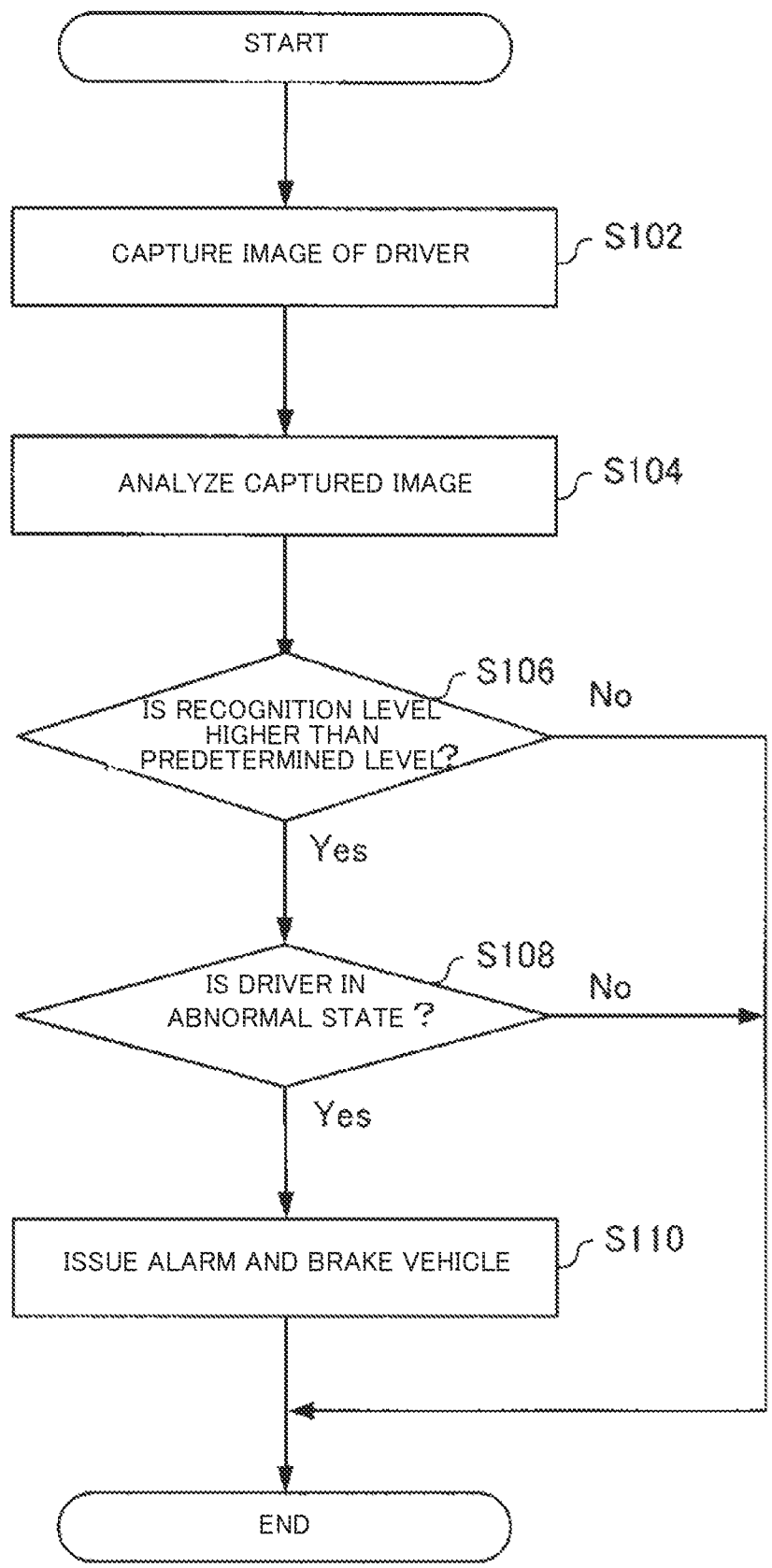
FIG. 3 is a flowchart for illustrating an operation example of the driver assistance device 10.

An operation example of the driver assistance device 10 will be described with reference to FIG. 3. FIG. 3 is a flowchart for illustrating the operation example of the driver assistance device 10. Processes shown in FIG. 3 are performed while the vehicle 1 is traveling.

First, the imaging device 2 of the vehicle 1 captures an image of the driver of the vehicle 1 (step S102). The imaging device 2 sequentially outputs captured images obtained by capturing the driver at predetermined intervals to the image analysis part 142.

Next, the image analysis part 142 analyzes the captured image captured by the imaging device 2 (step S104). First, the image analysis part 142 recognizes the face of the driver in the captured image. However, if the driver is wearing a worn article such as a mask on his/her face, the image analysis part 142 might not recognize the face stably.

When the level of recognition of the face is higher than the predetermined level (step S106: Yes), the state determination part 143 determines whether the driver is in an abnormal state (step S108). For example, the state determination part 143 determines that the driver is in the abnormal state when the collapsed posture of the driver is severe or when the driver's closed eye state is continuing.

When it is determined in step S108 that the driver is in the abnormal state (Yes), the abnormality determination processing part 145 issues an alarm and brakes the vehicle 1 (step S110). Specifically, the abnormal case processing part 144 of the abnormality determination processing part 145 first causes the alarm device 4 to provide a notification to the effect that the vehicle 1 is caused to perform automatic braking. When the cancellation detection part 6 does not detect the cancellation performed by the driver within a predetermined time period in response to the notification, the abnormal case processing part 144 operates the brake device 8 to cause the vehicle 1 to perform automatic braking. This makes it possible to safely stop the vehicle 1 in which the driver is in the abnormal state.

On the other hand, when the driver wears a mask or the like and the level of recognition of the face is lower than the predetermined level (step S106: No), the abnormality determination processing part 145 does not perform the emergency driving stop process in steps S108 and S110. That is, the alarm device 4 and the brake device 8 are not operated (i) when the abnormal state is determined based on the erroneously recognized captured images and (ii) when the abnormal state is determined. In this manner, it is possible to prevent erroneously operating the emergency driving stop process due to the erroneous detection. The driver assistance device 10 continuously performs the series of processes described above while the vehicle 1 is traveling.

Effects of the Present Embodiment

The driver assistance device 10 according to the above-described embodiment analyzes the captured images of the driver's face captured by the imaging device 2. Then, the driver assistance device 10 determines whether or not the driver is in the abnormal state on the basis of the analysis result of the captured images, and performs the emergency driving stop process of causing the vehicle 1 to perform automatic braking when the driver is in the abnormal state. On the other hand, when the level of recognition of the face at the time of analyzing the captured images is lower than the predetermined level, the driver assistance device 10 does not perform the above-described emergency driving stop process. Therefore, whether the driver is in the abnormal state or not is determined when the face can be recognized stably, and therefore an erroneous determination of the abnormal state can be prevented. As a result, it is possible to prevent the emergency driving stop process from operating due to the erroneous determination of the abnormal state of the driver.

The present disclosure is explained based on the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

DESCRIPTION OF THE REFERENCE NUMERALS

1 Vehicle
2 Imaging device
10 Driver assistance device
142 Image analysis part
145 Abnormality determination processing part

What is claimed is:

1. A driver assistance device comprising a memory storing executable instructions that, in response to execution, cause a processor to perform operations comprising:
   analyzing a captured image obtained by capturing a face of a driver of a vehicle;
   a recognition process of determining whether a level of recognition of the face is lower than a predetermined level corresponding to wearing a mask on the basis of an analysis result of the captured image;
   when the level of recognition of the face is greater than the predetermined level corresponding to wearing the mask, performing a (i) determination process of determining whether a state of the driver is an abnormal state on the basis of an analysis result of the captured image, and (ii) performing an emergency driving stop process of causing the vehicle to perform automatic braking when the driver is determined to be in the abnormal state;
   when the level of recognition of the face is lower than the predetermined level corresponding to wearing the mask for a first predetermined time, temporarily performing neither the (i) determination process of determining whether the state of the driver is the abnormal state on the basis of the analysis result of the captured image, nor the (ii) emergency driving stop process of causing the vehicle to perform the automatic braking when the driver is determined to be in the abnormal state; and
   ceasing performing the emergency driving stop process if a ratio of a time period in which the level of recognition is lower than the predetermined level exceeding a predetermined ratio within a reference time period.

2. The driver assistance device according to claim 1, wherein the processor performs further operations comprising:
   analyzing the captured image obtained by an imaging device and capturing a predetermined imaging range, and
   not performing the emergency driving stop process when the level of recognition of the face positioned within the imaging range is lower than the predetermined level.

3. The driver assistance device according to claim 1, wherein the processor performs further operations comprising:
   detecting at least one feature point of a face from the captured image, and
   determining that the level of recognition of the face is lower than the predetermined level when a number of detected feature points is less than a predetermined number.

4. The driver assistance device according to claim 1, wherein the processor performs further operations comprising:
   analyzing a captured image obtained by capturing the face on which a worn article is worn, and
   not performing the emergency driving stop process when the level of recognition of the face is lower than the predetermined level due to the worn article.

5. The driver assistance device according to claim 4, wherein the processor performs further operations comprising analyzing a captured image obtained by capturing, with an infrared camera, the face on which a black worn article is worn.

6. The driver assistance device according to claim 1, wherein the processor performs further operations comprising not performing the emergency driving stop process when the level of recognition of the face continues to be lower than the predetermined level for a predetermined time.

* * * * *